(12) United States Patent
Garner et al.

(10) Patent No.: US 9,004,821 B2
(45) Date of Patent: Apr. 14, 2015

(54) AIR CONVEYOR GUIDE ADJUSTMENT MECHANISM

(71) Applicant: Alliance Industrial Corporation, Lynchburg, VA (US)

(72) Inventors: Gary R. Garner, Lynchburg, VA (US); Thomas J. Ligue, Evington, VA (US)

(73) Assignee: Alliance Industrial Corporation, Lynchburg, VA (US)

( * ) Notice: Subject to any disclaimer, the term of this patent is extended or adjusted under 35 U.S.C. 154(b) by 181 days.

(21) Appl. No.: 13/791,942

(22) Filed: Mar. 9, 2013

(65) Prior Publication Data

US 2014/0255111 A1    Sep. 11, 2014

(51) Int. Cl.
*B65G 47/24* (2006.01)
*B65G 51/03* (2006.01)

(52) U.S. Cl.
CPC ...................................... *B65G 51/03* (2013.01)

(58) Field of Classification Search
USPC ............ 406/87, 88; 193/22; 198/817, 803.11, 198/626.3, 626.4
See application file for complete search history.

(56) References Cited

U.S. PATENT DOCUMENTS

| | | | | |
|---|---|---|---|---|
| 4,014,460 A * | 3/1977 | Bryan, Jr. ....................... | 221/156 |
| 4,299,335 A * | 11/1981 | Ostermann .................... | 221/241 |
| 4,405,059 A * | 9/1983 | Kull ............................... | 221/129 |
| 4,624,369 A * | 11/1986 | Okada ........................... | 209/626 |
| 4,760,671 A * | 8/1988 | Ward .............................. | 451/333 |
| 5,246,314 A * | 9/1993 | Smith et al. ...................... | 406/86 |
| 5,405,424 A * | 4/1995 | Steffan et al. .................... | 65/158 |
| 5,810,516 A * | 9/1998 | Ouellette ......................... | 406/86 |
| 6,332,740 B1 * | 12/2001 | Bernard et al. .................. | 406/88 |
| 6,598,380 B1 * | 7/2003 | Sgubbi ........................... | 53/566 |
| 6,860,088 B2 * | 3/2005 | Goodman ....................... | 53/443 |
| 7,040,477 B2 * | 5/2006 | Brixius et al. ............ | 198/370.08 |
| 7,210,572 B2 * | 5/2007 | Ingraham ................... | 198/836.3 |
| 7,213,386 B2 * | 5/2007 | Hooper .......................... | 53/448 |
| 7,530,453 B2 * | 5/2009 | Ingraham ................... | 198/836.3 |
| 7,891,484 B2 | 2/2011 | Ranger | |
| 8,047,756 B2 * | 11/2011 | Tuffs et al. .................... | 414/392 |
| 2003/0046904 A1 * | 3/2003 | Goodman ....................... | 53/448 |
| 2005/0229548 A1 * | 10/2005 | Hooper .......................... | 53/475 |
| 2007/0175733 A1 * | 8/2007 | Lenhardt .................... | 198/468.6 |
| 2009/0290942 A1 * | 11/2009 | Delaporte et al. .............. | 406/88 |
| 2013/0126301 A1 * | 5/2013 | Resca Cacciari et al. . | 198/419.1 |
| 2013/0180207 A1 * | 7/2013 | Monti ............................. | 53/235 |
| 2013/0186043 A1 * | 7/2013 | Monti .......................... | 53/381.1 |

* cited by examiner

*Primary Examiner* — Joseph Dillon, Jr.
(74) *Attorney, Agent, or Firm* — Quarles & Brady LLP (57) ABSTRACT

An air conveyor system includes a base, a first guide position relative to the base, and a guide adjustment mechanism coupled to the first guide. The guide adjustment mechanism infinitely adjusts the first guide within a predetermined range and includes an electric linear actuator and a pivot arm coupled to the electric linear actuator that rotates in response to adjustment of the electric linear actuator. The guide adjustment mechanism also includes a first linkage arm coupled to the first guide and the pivot arm. The first linkage arm laterally moves the first guide responsive to rotation of the pivot arm.

16 Claims, 7 Drawing Sheets

FIG. 6 ness. It would be therefore desirable to provide a guide adjustment mechanism capable of automatically accommodating many different bottle widths with minimized changeover time.

AIR CONVEYOR GUIDE ADJUSTMENT MECHANISM

CROSS REFERENCE TO RELATED APPLICATIONS

None.

STATEMENT REGARDING FEDERALLY SPONSORED RESEARCH

Not Applicable.

BACKGROUND OF THE INVENTION

The present invention relates to an air conveyor guide adjustment mechanism. More specifically, the present invention relates to an air conveyor guide adjustment mechanism that provides infinite automatic adjustment of opposing air conveyor body guides within a preset range.

Air conveyors move plastic bottles along a tunnel through forced air. The bottles are suspended by their neck rings and the forced air is directed toward either the neck area or the body area of the bottles in the desired movement direction. Guides are positioned near the body area on either side of the bottles to provide stability and prevent bottle jams along the tunnel (e.g., due to bottles swaying back and forth). Typically, such guides include two discrete settings to accommodate bottles of two different widths. This is accomplished using a guide adjustment mechanism with a pneumatic actuator that controls the position of, and the width between, the guides. More specifically, the pneumatic actuator moves between a retracted position to accommodate bottles of a first width and an extended position to accommodate bottles of a second width.

Due to the two discreet settings of the pneumatic actuators, bottles that are not sized at the first width or the second width (or bottles not sized within about 3/16 of an inch to about 1/4 of an inch of the first width or the second width) cannot be conveyed. In some cases, the pneumatic actuators must be switched out along the air conveyor or mechanisms with adjustable set screws, clamp collars, etc. must be manually reset along the length of the pneumatic cylinders to accommodate these bottles. These methods require a substantial amount of "off" time of the conveyor (i.e., changeover time) to make such adjustments. In addition, in other cases, additional settings are obtained by coupling cylinders. However, this method is cumbersome and still only allows two discrete setting for each cylinder added. It would be therefore desirable to provide a guide adjustment mechanism capable of automatically accommodating many different bottle widths with minimized changeover time.

SUMMARY OF THE INVENTION

The present invention provides a guide adjustment mechanism for an air conveyor system that conveys plastic bottles or other materials. The guide adjustment mechanism provides infinite automatic adjustment of air conveyor guides within a preset range. The infinite automatic adjustment capabilities of the guide adjustment mechanism allow for quicker, more accurate changeover between bottles of different widths and accommodate a wider range of bottle sizes in comparison to conventional guide adjustment mechanisms.

A general objective of the present invention is to provide an air conveyor system including a base, a first guide position relative to the base, and a guide adjustment mechanism coupled to the first guide. The guide adjustment mechanism includes an electric linear actuator and a pivot arm coupled to the electric linear actuator that rotates in response to adjustment of the electric linear actuator. The guide adjustment mechanism also includes a first linkage arm coupled to the first guide and the pivot arm. The first linkage arm laterally moves the first guide responsive to rotation of the pivot arm.

According to another objective of the present invention, a guide adjustment mechanism for a conveyor system with a base and a first guide includes an electric linear actuator. The guide adjustment mechanism also includes a controller connected to the electric linear actuator that adjusts a length of the electric linear actuator and a pivot arm coupled to the electric linear actuator, where the pivot arm rotates in response to a length adjustment of the electric linear actuator. The guide adjustment mechanism further includes a first linkage arm coupled to the first guide and the pivot arm. The first linkage arm laterally moves the first guide responsive to rotation of the pivot arm.

This and still other objectives and advantages of the present invention will be apparent from the description which follows. In the detailed description below, preferred embodiments of the invention will be described in reference to the accompanying drawing. These embodiments do not represent the full scope of the invention. Rather the invention may be employed in other embodiments. Reference should therefore be made to the claims herein for interpreting the breadth of the invention.

DETAILED DESCRIPTION OF PREFERRED EMBODIMENTS

The present invention provides a guide adjustment mechanism for a conveyor system that conveys plastic bottles or other materials. The guide adjustment mechanism provides infinite automatic adjustment of conveyor guides within a preset range, in comparison to two discrete positions afforded by conventional guide adjustment mechanisms. Accordingly, the infinite automatic adjustment capabilities of the guide adjustment mechanism of the present invention allow for quicker, more accurate changeover between bottles of different widths and accommodate a wider range of bottle sizes in comparison to such conventional guide adjustment mechanisms.

Figure 1:
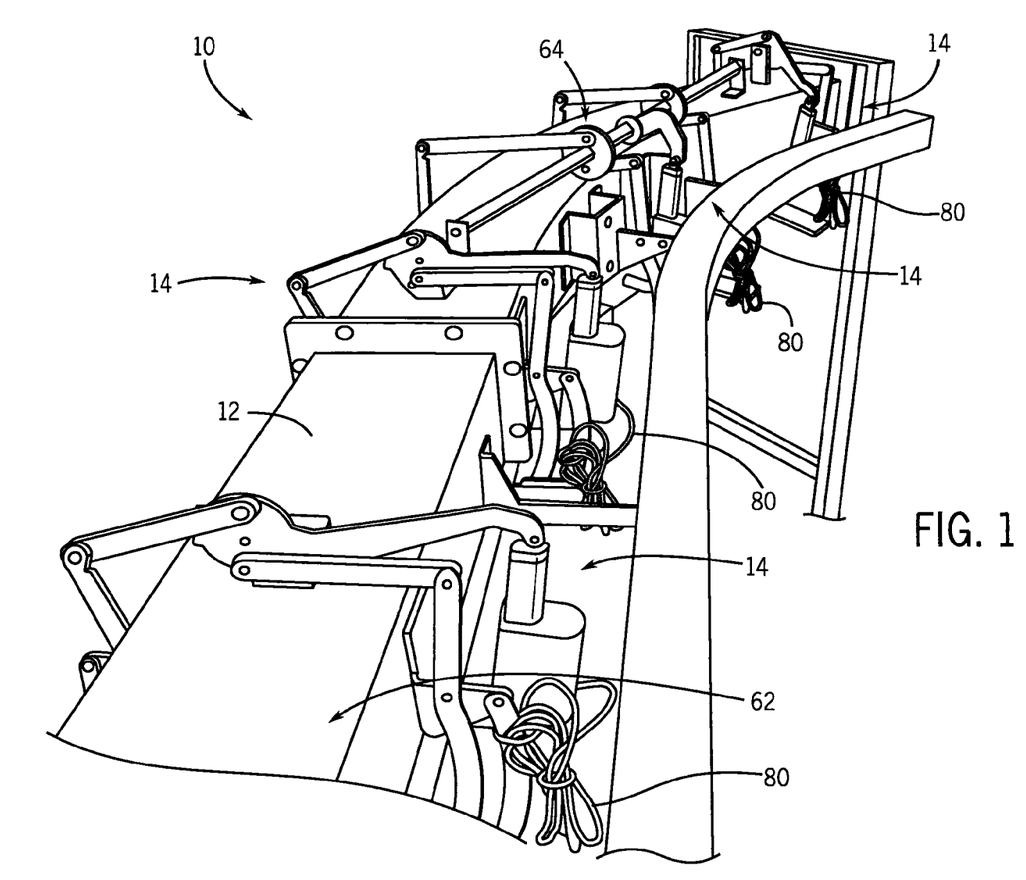
FIG. 1 is a perspective view of an air conveyor system.
Figure 2A:
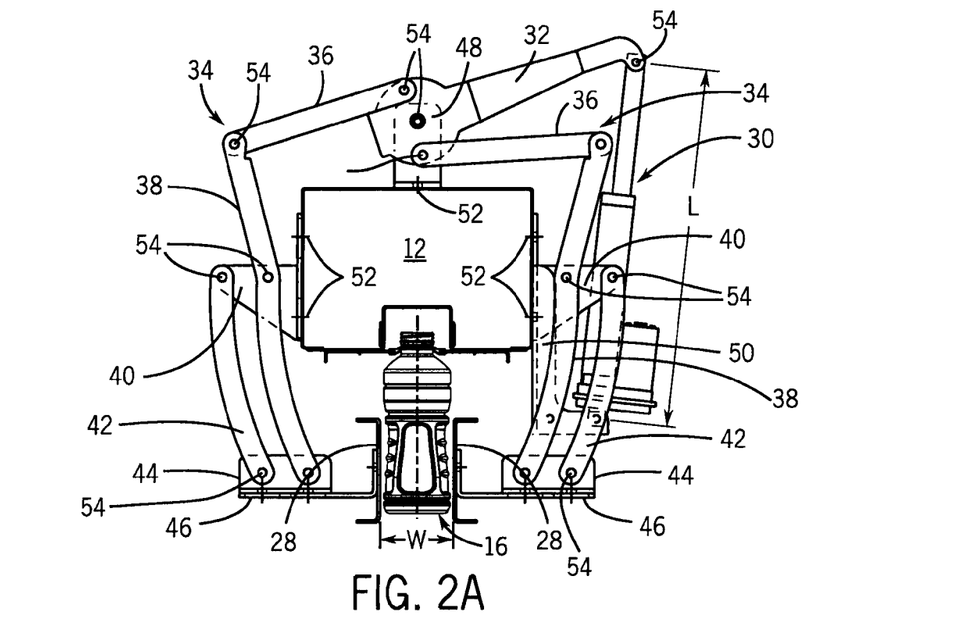
FIGS. 2A-2C are front cross-sectional views of air conveyor guide adjustment mechanisms.
Figure 2B:
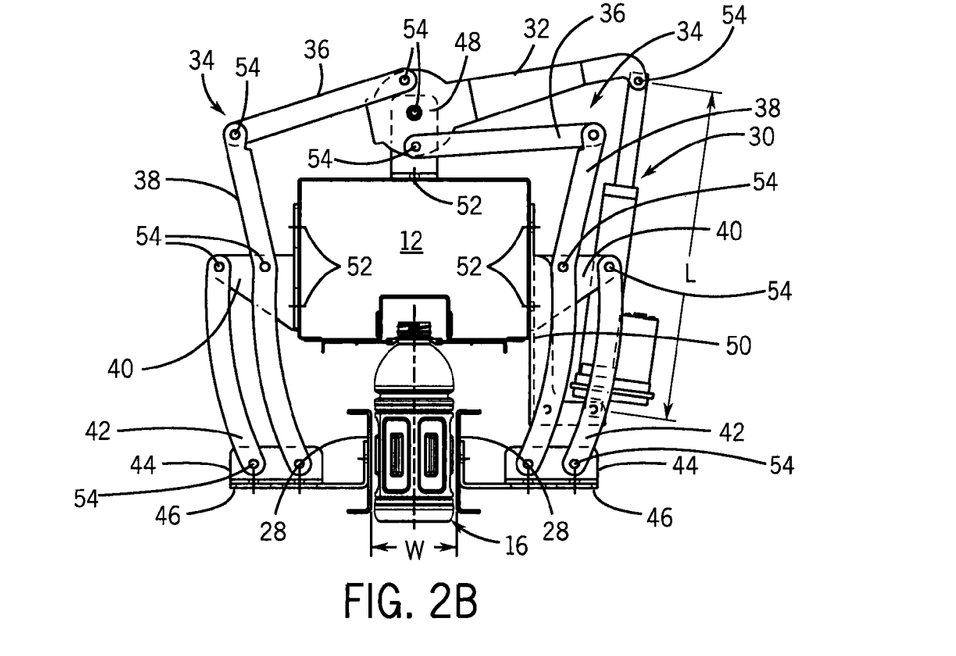
Figure 2C:
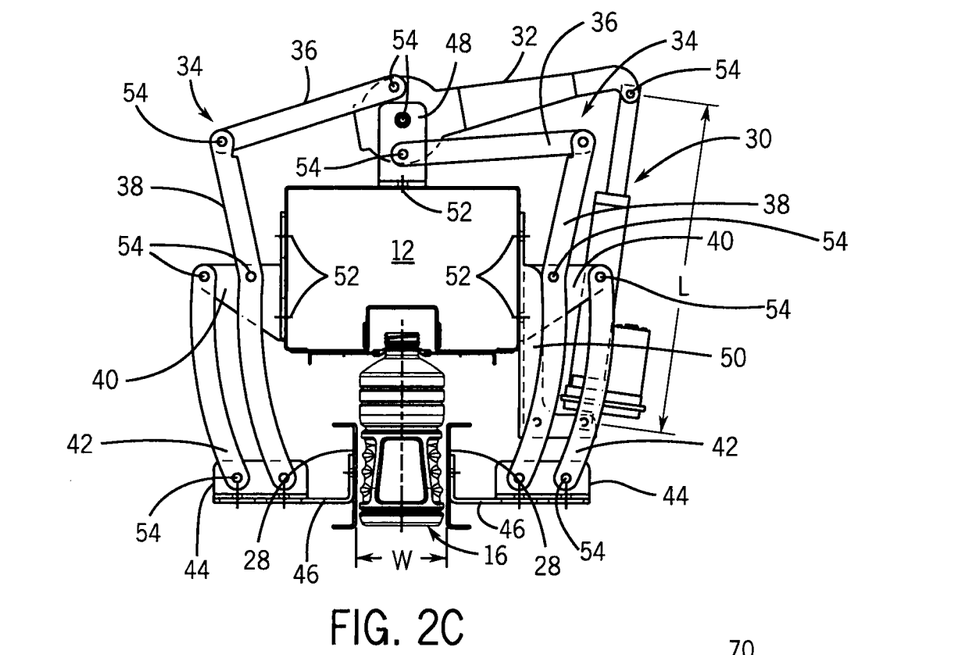
Figure 3:
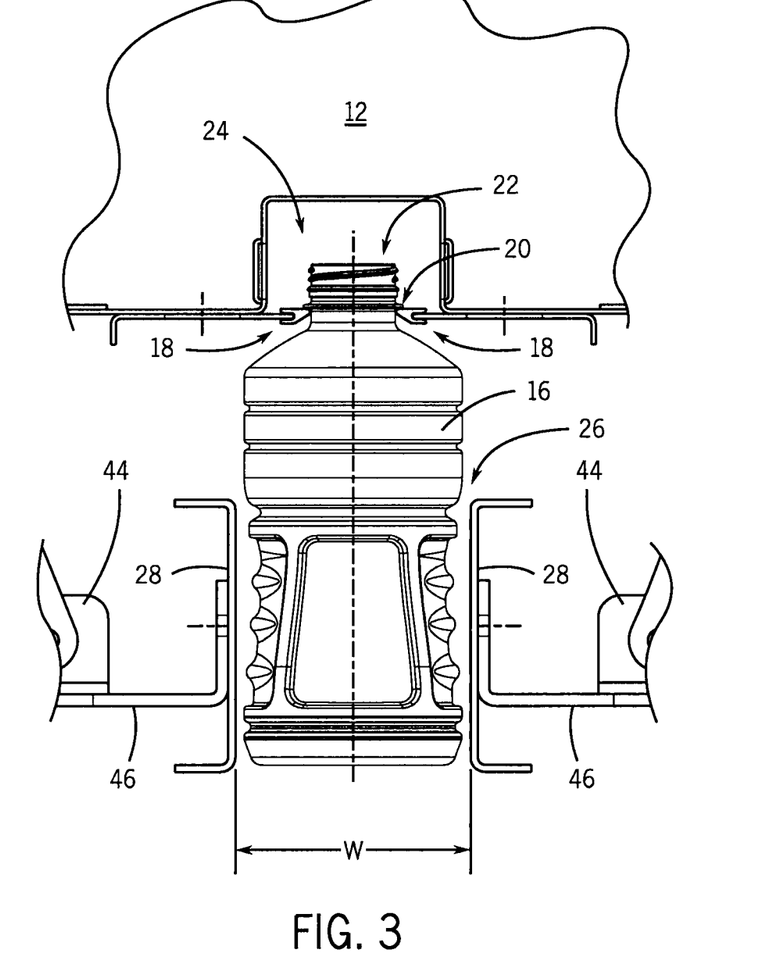
FIG. 3 is a partial cross-sectional view of the air conveyor guide adjustment mechanism of FIG. 2A.

FIG. 1 illustrates an air conveyor system 10, according to the present invention, including a base 12 and a plurality of guide adjustment mechanisms 14. The base 12 supports suspended bottles 16, as shown in FIGS. 2A-3, through opposing neck supports 18 spaced apart to engage a neck ring 20 of each bottle 16 (i.e., between the neck 22 of the bottle 16, positioned within a guideway 24, and the body 26 of the bottle 16). Forced air (via blowers, not shown) is used to move the bottles 16 along the base 12. In order to prevent the bottles 16 from swinging as they are forced along the base 12, adjustable guides 28 are positioned relative to the base 12 to contact bottle bodies 26, as shown in FIGS. 2A-3. Through operation of the guide adjustment mechanisms 14, the guides 28 are infinitely adjustable, within a preset range, to accommodate varying bottle widths. The guide adjustment mechanism 14 is also used in other types of conveyor systems, such as case conveyor systems (not shown). Components of the guide adjustment mechanism 14 of a case conveyor system (i.e., for adjusting case guides to accommodate varying case widths) are similar to those described below for the air conveyor system 10.

With further reference to the guide adjustment mechanism 14, the two guides 28 are simultaneously moved laterally toward or away from each other in response to movement of an electric linear actuator 30. More specifically, as shown in FIGS. 2A-3, the guide adjustment mechanism 14 includes the electric linear actuator 30, a pivot arm 32, linkage arms 34 (including upper linkage arms 36 and lower linkage arms 38), linkage brackets 40, short linkage arms 42, guide mounting brackets 44, 46, a base bracket 48, and an actuator mount 50. The components of the guide adjustment mechanism 14, with the exception of the electric linear actuator 30, are manufactured from stainless steel.

In addition, the base bracket 48, the linkage brackets 40, and the actuator mount 50 are coupled to the base 12 with fasteners 52 (i.e., maintaining fixed couplings between the components). The pivot arm 32 is pivotably coupled to the base 12 via the base bracket 48 and fasteners 54, the linkage arms 34 are pivotably coupled to the base 12 via the linkage brackets 40 and fasteners 54, and the electric linear actuator 30 is mounted to the base 12 via the actuator mount 50 and fasteners 52. The fasteners 54 maintain rotatable couplings between components, thus allowing the coupled components to pivot relative to one another at the fastener connection.

Figure 4:
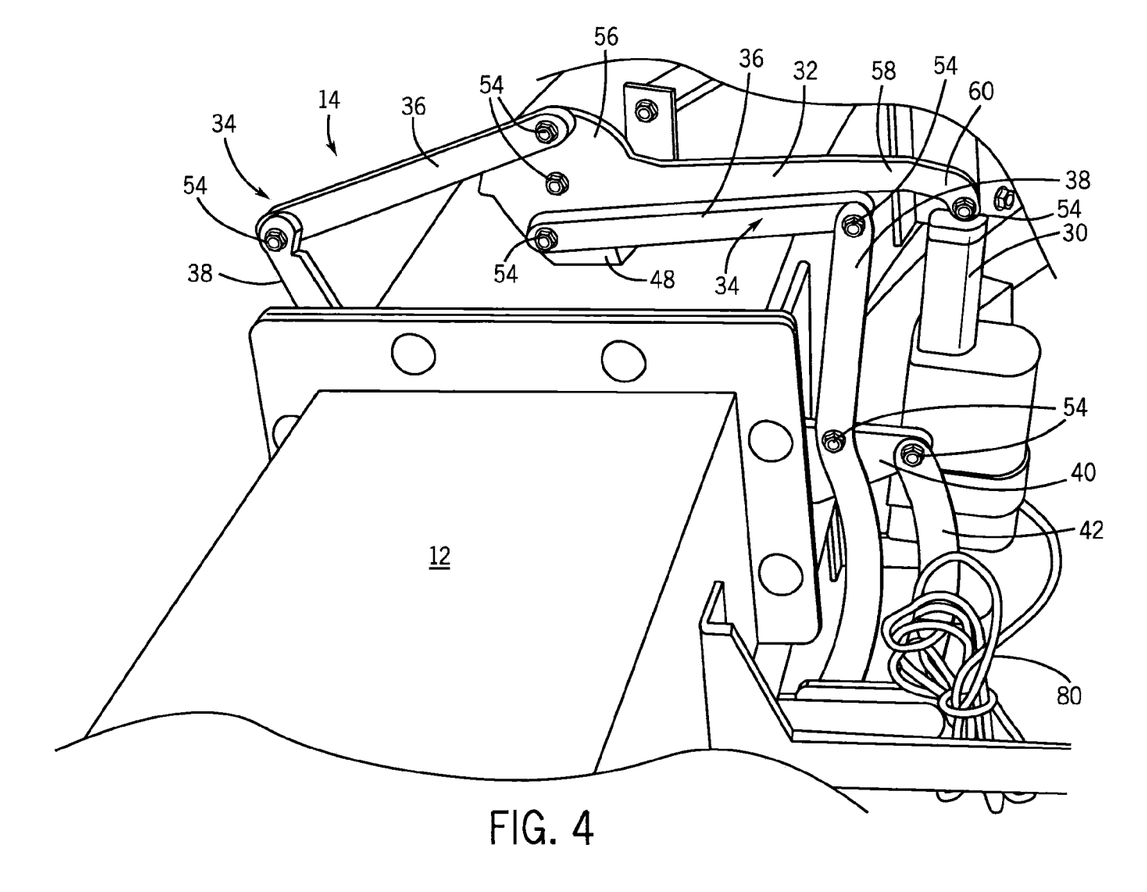
FIG. 4 is a partial perspective view of an air conveyor guide adjustment mechanism of the air conveyor system of FIG. 1.
Figure 5:
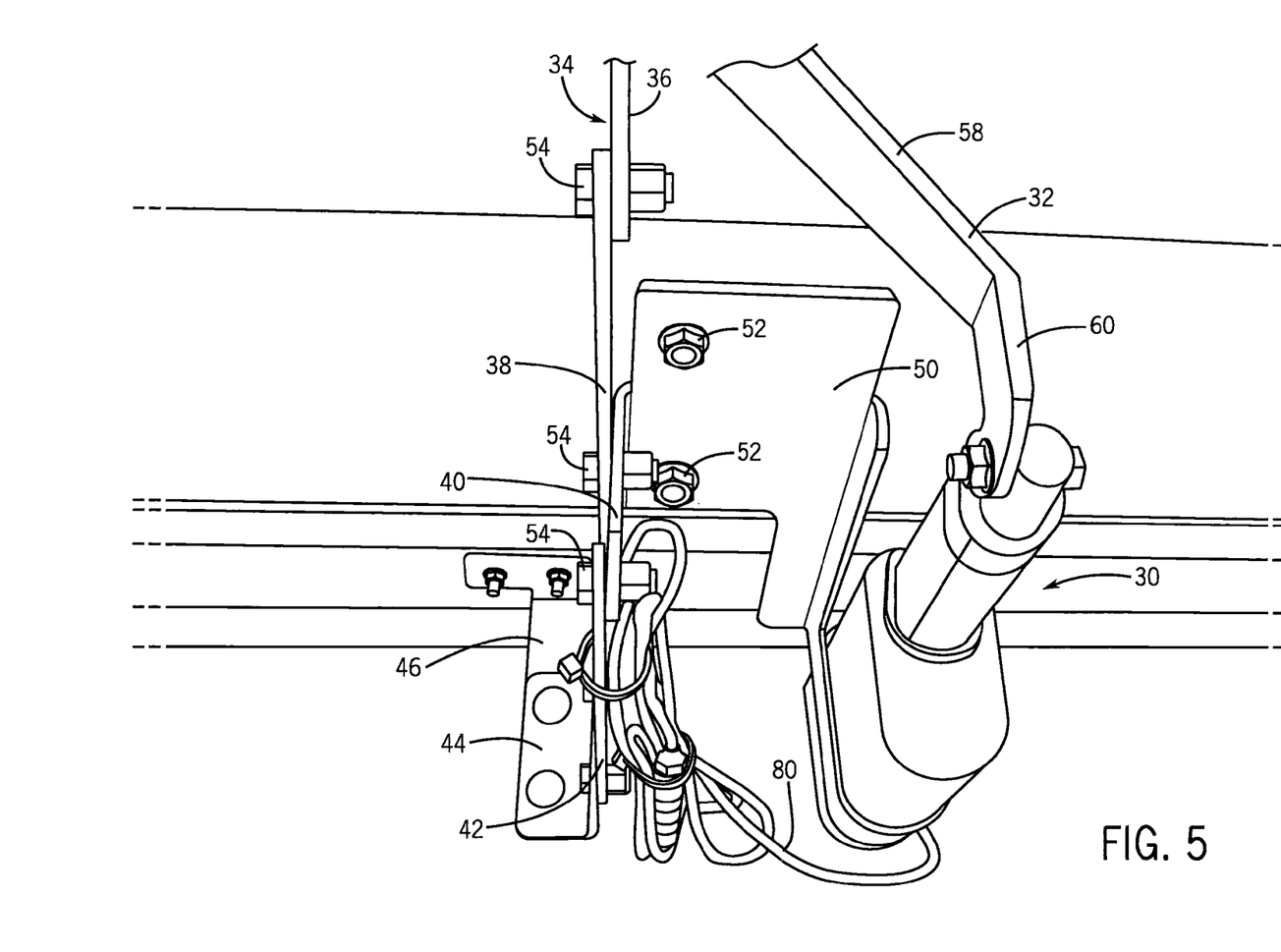
FIG. 5 is partial perspective top view of an air conveyor guide adjustment mechanism of the air conveyor system of FIG. 1.

As shown in FIGS. 2A-2C, the pivot arm 32 is also coupled to an end of the electric linear actuator 30, via fasteners 54, so that linear movement of the electric linear actuator 30 causes rotation of the pivot arm 32 at the base bracket 48. Furthermore, as shown in FIGS. 4 and 5, the electric linear actuator 30 is positioned along one side of the base 12 adjacent to a linkage arm 34. To accommodate connections to both the electric linear actuator 30 and the linkage arms 34, the pivot arm 32 includes a first straight section 56 that lies along a first plane (i.e., along the same plane as the linkage arms 34), an angled section 58 that intersects the first plane, and a second straight section 60 that lies along a second plane parallel to, and a distance away from, the first plane (i.e., along the same plane as the electric linear actuator 30).

With reference to the linkage arms 34, each upper linkage arm 36 is coupled to both the pivot arm 32 and a respective lower linkage arm 38, and each lower linkage arm 38 is also coupled to a respective guide mounting bracket 44. Each guide mounting bracket 46, connected to or integral with a guide mounting bracket 44, is coupled to a respective guide 28. Rotation of the pivot arm 32 causes movement of each upper linkage arm 36, which in turn causes rotation of each lower linkage arm 38 at the linkage bracket 40 and linear movement of each guide mounting bracket 46. As a result, rotation of the pivot arm 32 that causes outward movement of each upper linkage arm 36 causes inward lateral movement of the guide mounting brackets 44, 46, thus adjusting the guides 28 toward each other via the lower linkage arms 38. In contrast, rotation of the pivot arm 32 that causes inward movement of the upper linkage arms 36 causes outward lateral movement of the guide mounting brackets 44, 46, thus adjusting the guides 28 away from each other via the lower linkage arms 38. In addition, the short linkage arms 42 are coupled to the linkage brackets 40 and the guide mounting brackets 44 and help maintain the horizontal orientation of the guide mounting brackets 46.

Accordingly, the pivot arm 32 rotates in response to movement of the electric linear actuator 30, causing the linkage arms 34 to simultaneously move and pivot about connection points on the linkage brackets 40 and, as a result, causing both of the guides 28 to simultaneously move laterally toward or away from each other. The electric linear actuator 30, unlike conventional pneumatic actuators, is capable of infinitely adjustable lengths within a preset range (e.g., 0 inches to about 5.9 inches). As a result, the width W between guides can be infinitely adjustable within a preset range (e.g., up to about 2.63 inches) through adjustment of the electric linear actuator 30, thus allowing the guides 28 to accommodate common bottle widths including and between 8-ounce bottles and 3-liter bottles. For example, FIG. 2A illustrates a guide width W of about 3.21 inches (with a total actuator length L of about 15.52 inches), FIG. 2B illustrates a guide width W of about 3.71 inches (with a total actuator length L of about 14.37 inches), and FIG. 2C illustrates a guide width W of about 3.86 inches (with a total actuator length L of about 14.13 inches).

In contrast, conventional pneumatic actuators are only capable of a fully extended position and a fully retracted position, thus only allowing two discrete guide positions and widths. Furthermore, other systems require time-consuming adjustment of set screws, springs, or other mechanisms to accomplish adjusting a width between guides. The electric linear actuator 30 and guide adjustment mechanism 14 of the present invention allows for at least three or more guide positions and widths and, more specifically, infinite adjustment of guide width W within a preset range substantially "on the fly", thus allowing for a quicker, more accurate changeover between bottles 16 of different widths, increased operating time of the air conveyor system 10, and a wider range of bottle sizes in comparison to conventional systems. In addition, while some other systems may be able to achieve three or more guide positions, such systems require multiple servo-valve cylinders for each mechanism, complex pressure-adjustment mechanisms for each pneumatic cylinder, or ball-screw actuators. These other systems are more expensive, complex, and cumbersome than the guide adjustment mechanism 14 of the present invention and also develop inaccuracies over time.

Referring back to FIG. 1, the air conveyor system 10 includes straight sections 62 and curved sections 64. The guides 28 extend the length of the air conveyor system 10 (in both straight and curved sections 62, 64), while the guide adjustment mechanisms 14 are spaced apart to adjust the guides 28 at intervals. For example, two guide adjustment mechanisms 14 are positioned within each ten feet of straight section 62 and each curved section 64 includes a single guide adjustment mechanism 14, as further described below. The electric linear actuators 30 of each guide adjustment mechanism 14 are connected to and controlled by control boxes or controllers (not shown), wherein each control box controls up to twelve electric linear actuators 30 (i.e., controls individual motors, not shown, of each respective electric linear actuator 30 to adjust a length of each respective electric linear actuator 30). This eliminates the need for each guide adjustment mechanism 14 to be individually adjusted, as is required for conventional mechanisms with set screws. In addition, due to the motor-controlled length of the electric linear actuators 30, accurate, uniform guide widths can be obtained across the length of the air conveyor system 10. The guide adjustment mechanisms 14 are capable of being installed in new equipment or retrofitted into existing equipment.

Figure 6:
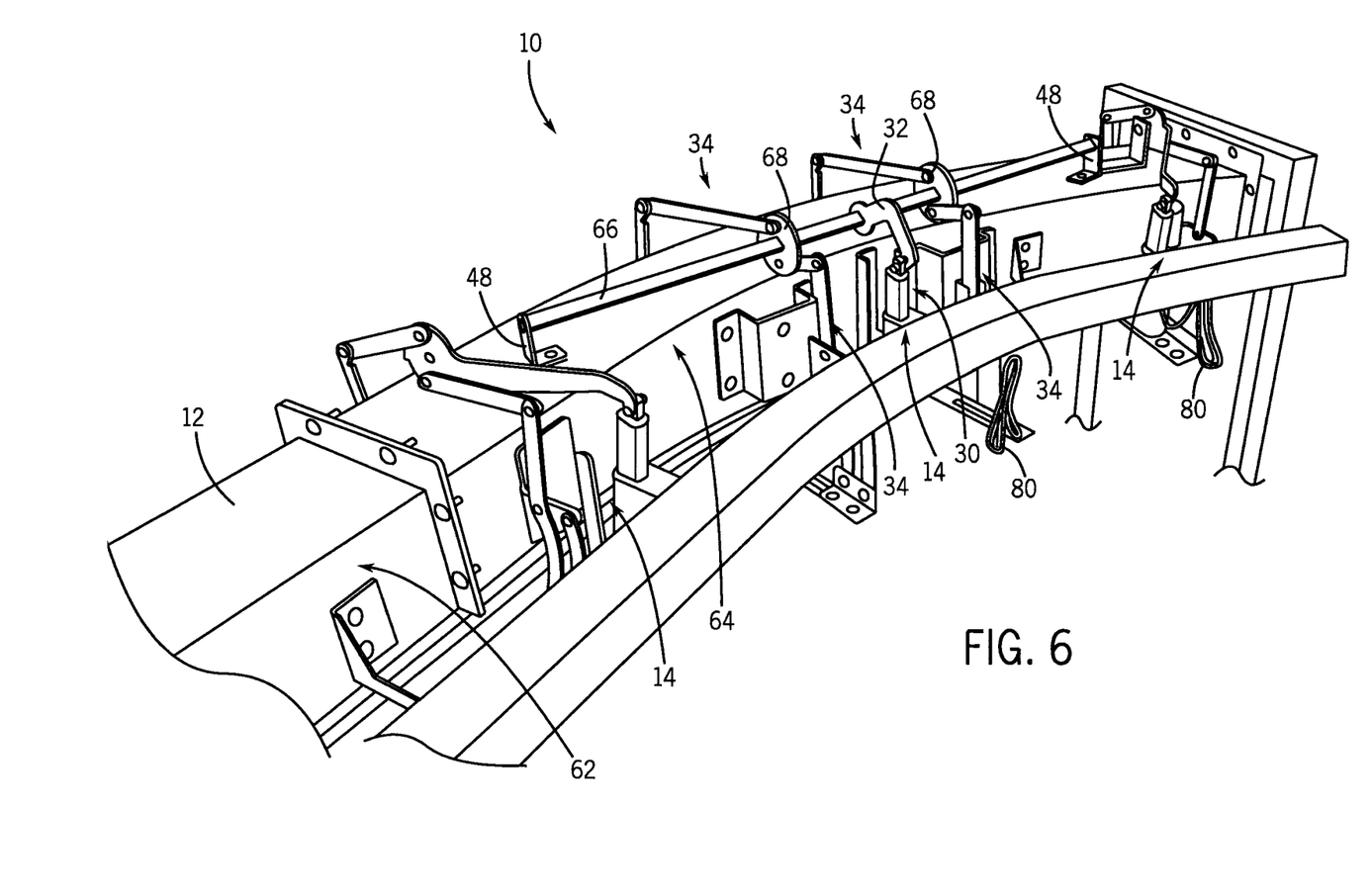
FIG. 6 is another perspective view of the air conveyor system of FIG. 1.

As described above, each curved section 64 of the air conveyor system 10 includes a single guide adjustment mechanism 14. However, as shown in FIGS. 1 and 6, the single guide adjustment mechanism 14 for curved sections 64 includes two sets of linkage arms 34 (connected to guides 28, as described above) controlled by a single linear actuator 30. More specifically, a pivot arm 32 is coupled to an end of the linear actuator 30 and to a length of tubing 66 (e.g., supported along the base 12 by base brackets 48). Linear movement of the linear actuator 30 causes rotation of the pivot arm 32 and rotation of the tubing 66. The tubing 66 is also connected to secondary pivots 68 that are each further connected to a respective set of linkage arms 34. As a result, rotation of the tubing 66 causes rotation of both secondary pivots 68 and both sets of linkage arms 34. This allows for guide adjustment in two separate areas of the curved section 64 using a single linear actuator 30.

Figure 7:
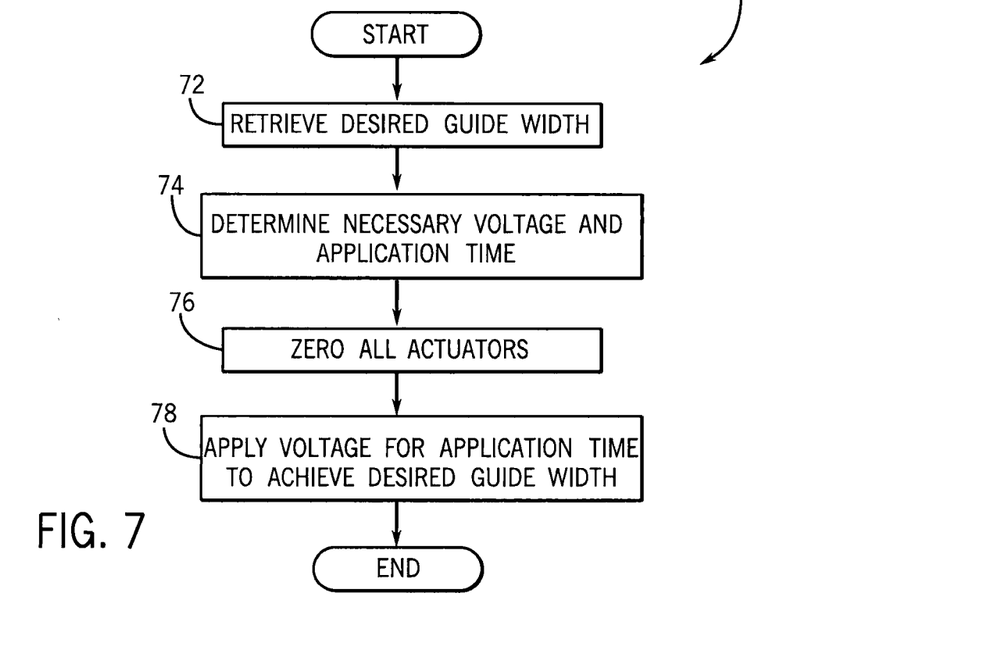
FIG. 7 is a flow chart illustrating a control process for a guide adjustment mechanism of a conveyor system.

With further reference to control of the guide adjustment mechanisms 14, FIG. 7 illustrates a control process 70, executed by the controllers described above, that ensures guide width accuracy and removes the need to include expensive feedback systems to positively determine guide positions and widths. More specifically, after the process begins, a controller retrieves a desired guide width at step 72. This includes either receiving an input of the actual desired width or receiving an input of a desired bottle type and size and determining the desired width based on this input. Next, at step 74, the controller determines a necessary voltage and voltage application time necessary for the electric linear actuators 30 to achieve the desired guide width. The controller then returns all electric linear actuators 30 to their "zero" position (i.e., their shortest length) at step 76. After the electric linear actuators 30 are zeroed, the controller applies the necessary voltage for the voltage application time to achieve the required actuator length for providing the desired guide width at step 78. At this point, the process is completed and the guides 28 are at the desired width. The zeroing of all electric linear actuators 30 before each adjustment helps avoid accumulation of error over multiple adjustments, as is common in conventional systems, and also avoids the need to include feedback systems to ensure correct positioning after adjustment. In addition, to ensure a consistent voltage is applied to each electric linear actuator 30, cables 80 (shown in FIGS. 1 and 4-6) connecting each electric linear actuator 30 to the controller are equal in length.

While there has been shown and described what are at present considered the preferred embodiments of the invention, it will be obvious to those skilled in the art that various changes and modifications can be made therein without departing from the scope of the invention defined by the appended claims.

We claim:

1. An air conveyor system comprising:
   a base for supporting an article being conveyed by a conveying means;
   a first guide positioned relative to said base; and
   a guide adjustment mechanism infinitely adjusting said first guide within a predetermined range relative to said base, said guide adjustment mechanism including:
   an electric linear actuator,
   a pivot arm pivotally coupled to said base and pivoted by said electric linear actuator, said pivot arm rotating in response to linear adjustment of said electric linear actuator, and
   a first linkage arm coupled to said first guide and said pivot arm, said first linkage arm laterally moving said first guide responsive to rotation of said pivot arm, and including a first upper linkage arm coupled to a first lower linkage arm.

2. The air conveyor system of claim 1 and further comprising a second guide positioned a variable distance away from said first guide; and a second linkage arm coupled to said second guide and said pivot arm, said second linkage arm laterally moving said second guide responsive to rotation of said pivot arm.

3. The air conveyor system of claim 2 and further comprising a controller that adjusts a length of said electric linear actuator within a preset range of lengths to cause lateral movement of said first guide and said second guide toward and away from each other to adjust a width between said first guide and said second guide.

4. The air conveyor system of claim 1 and further comprising a first bracket coupled to said base, wherein said first linkage arm is coupled to said first bracket at a first pivot connection and pivots about said first pivot connection.

5. The air conveyor system of claim 4 and farther comprising a short linkage arm, wherein said short linkage arm is coupled to said first bracket and said first guide.

6. The air conveyor system of claim 1 and further comprising a first guide mounting bracket, wherein said first linkage arm is coupled to said first guide via said first guide mounting bracket.

7. The air conveyor system of claim 1 and further comprising an electric linear actuator mount, wherein said electric linear actuator is coupled to said base via said electric linear actuator mount.

8. The air conveyor system of claim 1 and further comprising base bracket, wherein said pivot arm is pivotally coupled to said base via said base bracket.

9. A guide adjustment mechanism for a conveyor system with a base for supporting an article being conveyed by a conveying means and a first guide, said guide adjustment mechanism comprising:
   an electric linear actuator;
   a controller connected to said electric linear actuator and infinitely adjusting a length of said electric linear actuator within a preset range of lengths relative to the base;
   a pivot arm pivotally coupled to said base and pivoted by said electric linear actuator, said pivot arm rotating in response to adjustment of said electric linear actuator; and
   a first linkage arm coupled to said first guide and said pivot arm, said first linkage arm laterally moving said first guide responsive to rotation of said pivot arm, and including a first upper linkage arm coupled to a first lower linkage arm.

10. The guide adjustment mechanism of claim 9, wherein said conveyor system includes a second guide positioned a variable distance away from said first guide, and further comprising a second linkage arm coupled to said second guide and said pivot arm, said second linkage arm laterally moving said second guide responsive to rotation of said pivot arm.

11. The guide adjustment mechanism of claim 10, where said controller adjusts said length of said electric linear actuator within a preset range of lengths to cause lateral movement of said first guide and said second guide toward and away from each other to adjust a width between said first guide and said second guide.

12. The guide adjustment mechanism of claim 9 and further comprising a first bracket coupled to said base, wherein said first pivot arm is coupled to said first bracket at a first pivot connection and pivots about said first pivot connection.

13. be guide adjustment mechanism of claim 12 and further comprising a short linkage arm, wherein said short linkage arm is coupled to said first bracket and said first guide.

14. The guide adjustment mechanism of claim 9 and further comprising a first guide mounting bracket, wherein said first linkage arm is coupled to said first guide via said first guide mounting bracket.

15. The guide adjustment mechanism of claim 9 and further comprising an electric linear actuator mount, wherein said electric linear actuator is coupled to said base via said electric linear actuator mount.

16. The guide adjustment mechanism of claim 9 and further comprising base bracket, wherein said pivot arm is pivotably coupled to said base via said base bracket.

\* \* \* \* \*

UNITED STATES PATENT AND TRADEMARK OFFICE
CERTIFICATE OF CORRECTION

| | | |
|---|---|---|
| PATENT NO. | : 9,004,821 B2 | Page 1 of 1 |
| APPLICATION NO. | : 13/791942 | |
| DATED | : April 14, 2015 | |
| INVENTOR(S) | : Gary R. Garner et al. | |

It is certified that error appears in the above-identified patent and that said Letters Patent is hereby corrected as shown below:

In the Claims

Column 6, line 27
"farther" should be --further--

Column 6, line 40
"pivotally" should be --pivotably--

Column 7, line 6
"pivot" should be --linkage--

Column 7, line 8
"be" should be --The--

Signed and Sealed this
Twenty-second Day of September, 2015

Michelle K. Lee
*Director of the United States Patent and Trademark Office*